(12) United States Patent
Inoue

(10) Patent No.: US 8,054,716 B2
(45) Date of Patent: Nov. 8, 2011

(54) OPTICAL DISC APPARATUS AND DEFOCUS CONTROL METHOD

(75) Inventor: Katsuichi Inoue, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1454 days.

(21) Appl. No.: 11/344,109

(22) Filed: Feb. 1, 2006

(65) Prior Publication Data

US 2006/0171272 A1 Aug. 3, 2006

(30) Foreign Application Priority Data

Feb. 2, 2005 (JP) ................... 2005-025961

(51) Int. Cl.
*G11B 7/00* (2006.01)
(52) U.S. Cl. .................. 369/44.32; 369/53.28
(58) Field of Classification Search ............... 369/47.32, 369/44.27, 47.36, 53.19, 44.29, 44.32, 44.35, 369/44.13, 47.51, 53.23, 53.28, 53.34
See application file for complete search history.

(56) References Cited

U.S. PATENT DOCUMENTS

| | | | | |
|---|---|---|---|---|
| 6,240,055 B1 | 5/2001 | Takamine et al. | ......... | 369/44.29 |
| 6,339,580 B1 | 1/2002 | Kawashima et al. | .... | 369/124.01 |
| 6,400,661 B1 | 6/2002 | Ogawa et al. | ............. | 369/44.27 |
| 6,430,119 B1 | 8/2002 | Okada et al. | ............... | 369/30.11 |
| 6,731,573 B2* | 5/2004 | Takeda | ........................ | 369/44.29 |
| 7,286,447 B2* | 10/2007 | Ma et al. | .................... | 369/44.13 |
| 2006/0013082 A1* | 1/2006 | Ogura et al. | ............... | 369/44.27 |

FOREIGN PATENT DOCUMENTS

| | | |
|---|---|---|
| EP | 0 499 925 A2 | 8/1992 |
| JP | 2003-257053 | 9/2003 |
| JP | 2003-323728 | 11/2003 |

* cited by examiner

*Primary Examiner* — Adam R Giesy

(74) *Attorney, Agent, or Firm* — Morgan, Lewis & Bockius LLP

(57) ABSTRACT

A defocus adjustment method includes a step of storing in a memory a range of defocus values for smooth operation of an optical disc apparatus, a step of measuring the defocus value of the optical disc loaded in the optical disc apparatus, a step of comparing the defocus value and the range of defocus values, a step of determining the optimal defocus value, and a step of using the optimal defocus value as a focusing bias value. This helps easily and quickly perform defocus adjustment that suits the loaded optical disc. Using as a focus bias value the defocus value determined through the defocus adjustment helps enhance the quality with which data is read from and data is written to the optical disc.

3 Claims, 3 Drawing Sheets

OPTICAL DISC APPARATUS AND DEFOCUS CONTROL METHOD

CROSS-REFERENCE TO RELATED APPLICATIONS

This application is based on Japanese Patent Application No. 2005-025961 filed on Feb. 2, 2005, the contents of which are hereby incorporated by reference.

BACKGROUND OF THE INVENTION

1. Field of the Invention

The present invention relates to an optical disc apparatus that can record data to and read data from an optical disc by irradiating it with laser light.

2. Description of Related Art

Optical discs are widely used as a recording medium for recording information such as video and audio. Optical discs permit information to be recorded thereto and read therefrom by being irradiated with laser light. Examples of widely used optical discs include, among others, CDs (compact discs) and DVD (digital versatile discs). Optical disc apparatuses that use such optical discs as a recording medium to record data thereto and read data therefrom are provided with an optical head that irradiates the recording surface of an optical disc with laser light to record data thereto and that detects the light reflected from the recording surface of an optical disc to read data therefrom.

FIG. 1 shows an arrangement of an optical disc apparatus. The optical disc apparatus PL shown in FIG. 1 includes: a spindle motor Sp that rotates an optical disc Ds; an optical head 1 that irradiates the optical disc Ds with laser light and detects the reflected light; a front end 3 that controls the spindle motor Sp and the optical head 1; a back end 4 that processes video, audio, and other source signals; a main controller Mc that controls the front end 3 and the back end 4; and a memory Me that stores various kinds of data. The optical head 1 includes an actuator 2 that changes the focus position (laser spot). In FIG. 1, solid lines represent paths along which video, audio, and other source signals pass, and dash-and-dot lines represent paths along which control signals or drive signals pass.

The front end 3 includes: an optical head servo controller 31 that controls the actuator 2 of the optical head 1; a spindle motor controller 32 that controls the rotation of the spindle motor Sp; a laser light controller 33 that controls the laser light from the optical head 1; and a signal processor 34 that modulates a signal for receiving a photoelectric conversion signal photoelectrically converted by the optical head 1 and that extracts an RF signal and a tracking error signal.

The back end 4 includes: a decoder 41 that decodes the signal fed from the front end 3; an encoder 42 that encrypts the data to be recorded to the optical disc Ds; and an input/output section 43 that outputs the data processed by the decoder 41 to an external device or inputs data fed from an external device to the encoder 42.

The focal length of the laser light emitted from the optical head 1 is constant within each individual optical head. To permit the optical disc Ds to be irradiated with laser light with an optimal laser spot formed at a predetermined position on the optical disc Ds, defocus adjustment is performed whereby the actuator 2 is so driven that the focus position is moved in the direction of the optical axis so as to optimize the position where the laser light is focused (laser spot). The actuator 2 is a coil arranged in a magnetic field, and can be moved in the axial direction when a current is passed therethrough. The defocus value is expressed in terms of the value of the bias current passed through the actuator 2. Defocus adjustment is performed every time an optical disc is loaded.

When a pre-recorded optical disc Ds is played back, the front end of the optical disc apparatus determines the defocus value so that the jitter value is optimal (minimal) and the error rate value is optimal (minimal). Specifically, the defocus value is so determined that the amplitude of the RF signal received by the signal processor 34 is maximal. The defocus value is measured by the following procedure.

The optical head servo controller 31 transmits a focus servo control signal to the actuator 2 of the optical head 1 to change the position irradiated with the focus of the laser light (laser spot). In this state, the optical disc Ds is rotated and is irradiated with the laser light, and the light reflected therefrom is measured with the optical head 1. At this time, the reflected light is photoelectrically converted by the optical head 1, and the resulting photoelectric conversion signal is fed to the signal processor 34.

The signal processor 34 extracts the RF signal from the photoelectric conversion signal fed thereto, and feeds the value of the amplitude of the RF signal to the main controller Mc. The main controller Mc stores in the memory Me, as the maximal defocus value, the defocus value outputted from the optical head servo controller 31 to the actuator 2 when the amplitude of the RF signal is maximal.

When the information on the optical disc Ds is read, the main controller Mc reads the optimal defocus value from the main controller Mc, and feeds it, as a focusing bias value, to the optical head servo controller 31. Using the focusing bias value thus fed from the main controller Mc, the optical head servo controller 31 controls the actuator 2 of the optical head 1.

When information is recorded to an optical disc on which no information has been recorded, no RF signal can be detected, and therefore the TE (tracking error) signal is used instead to determine the defocus value. The optical head servo controller 31 transmits a focus servo control signal to the actuator 2 of the optical head 1 to change the position irradiated with the focus of the laser light (laser spot). In this state, the optical disc Ds is rotated and is irradiated with the laser light, and the light reflected therefrom is measured with the optical head 1. At this time, the reflected light is photoelectrically converted by the optical head 1, and the resulting photoelectric conversion signal is fed to the signal processor 34.

The signal processor 34 extracts the TE signal from the photoelectric conversion signal fed thereto, and feeds the value of the amplitude of the TE signal to the main controller Mc. The main controller Mc stores in the memory Me, as the maximal defocus value, the defocus value outputted from the optical head servo controller 31 to the actuator 2 when the amplitude of the TE signal is maximal.

When information is recorded to the optical disc Ds, the main controller Mc reads the optimal defocus value from the main controller Mc, and feeds it, as a focusing bias value, to the optical head servo controller 31. Using the focusing bias value thus fed from the main controller Mc, the optical head servo controller 31 controls the actuator 2 of the optical head 1.

In reality, however, because of manufacturing, assembly, and other errors in its components, the optical head 1 does not always provide the optimal jitter value and the optimal error rate when the amplitude of the RF signal is maximal or when the amplitude of the TE signal is maximal. In a case where, as the defocus value for reading data from a recorded optical disc, the defocus value obtained when the amplitude of the RF signal is maximal is used, or in a case where, as the defocus value for recording data to an unrecorded optical disc, the defocus value obtained when the amplitude of the TE signal is maximal is used, the defocus value so used is not always the optimal defocus value.

Specifically, in cases where the above-mentioned defocus value obtained when the amplitude of the RF signal is maximal or when the amplitude of the TE signal is maximal is used, a large number of read errors may occur when data is red from a recorded optical disc, and a large number of write errors may occur when data is written to an unrecorded optical disc. This diminishes the operation stability or reliability of the optical disc apparatus.

SUMMARY OF THE INVENTION

In view of the conventionally encountered inconveniences mentioned above, it is an object of the present invention to provide an optical disc apparatus and a defocus adjustment method that permit defocus adjustment to be performed easily and quickly to suit a loaded optical disc and that permit the defocus value determined through the defocus adjustment to be used as a focus bias value to enhance the quality with which data is read from or data is written to the optical disc.

To achieve the above object, according to the present invention, an optical disc apparatus is provided with: a spindle motor that rotates an optical disc; an optical head that irradiates the optical disc with laser light to read information therefrom or write information thereto, the optical head including an actuator that changes the focus position of the laser light; a front end that includes an optical head servo controller that servo-controls the actuator, a spindle motor controller that controls the rotation of the spindle motor, a laser light controller that controls the laser light emitted from the laser light source of the optical head, and a signal processor that processes the signal read from the optical disc; a back end that processes video, audio, and other signals; a main controller that controls the front end and the back end; and a memory that stores various kinds of data. Here, the memory stores a range of defocus values appropriate for smooth operation of the optical disc apparatus, and the range of defocus values is determined according to the defocus values measured respectively, with respect to the optical disc apparatus, when the amplitude of the RF signal is maximal, when the amplitude of the tracking error signal is maximal, when the jitter value is optimal, and when the error rate is optimal. Moreover, the main controller, when data is read from a previously recorded optical disc, measures the defocus adjustment value obtained when the amplitude of the RF signal of the optical disc loaded in the optical disc apparatus is maximal, and, when data is written to an optical disc, measures the defocus adjustment value obtained when the amplitude of the tracking error signal of the optical disc loaded in the optical disc apparatus is maximal. The main controller then, when the defocus adjustment value thus measured is within the range of defocus values, uses the measured defocus adjustment value as a focusing bias value, and otherwise uses as a focusing bias value the value obtained by correcting the measured defocus adjustment value so as to bring it within the range of defocus values.

With this arrangement, it is possible to determine a defocus value that yields a large amplitude in the RF signal or in the tracking error signal combined with a good jitter value and a good error rate.

By adopting the so determined defocus value as a focusing bias value, it is possible to enhance the quality with which data is read from or written to the optical disc.

To achieve the above object, according to another aspect of the present invention, an optical disc apparatus is provided with: a spindle motor that rotates an optical disc; an optical head that irradiates the optical disc with laser light to read information therefrom or write information thereto, the optical head including an actuator that changes the focus position of the laser light; a front end that includes an optical head servo controller that servo-controls the actuator, a spindle motor controller that controls the rotation of the spindle motor, a laser light controller that controls the laser light emitted from the laser light source of the optical head, and a signal processor that processes the signal read from the optical disc; and a memory that stores a range of defocus values appropriate for smooth operation of the optical disc apparatus, the range of defocus values being determined according to the defocus values measured respectively, with respect to the optical disc apparatus, when the amplitude of the RF signal is maximal, when the amplitude of the tracking error signal is maximal, when the jitter value is optimal, and when the error rate is optimal; and a main controller that measures the defocus adjustment value obtained when the amplitude of the RF signal is maximal or when the amplitude of the tracking error signal is maximal, then compares the thus measured defocus adjustment value with the range of appropriate defocus values, the corrects the defocus adjustment value according to the result of the comparison, and then uses the defocus adjustment value as a focusing bias value.

With this arrangement, it is possible to easily and quickly determine a defocus value that yields a large amplitude in the RF signal or in the tracking error signal combined with a good jitter value and a good error rate.

By adopting the so determined defocus value as a focusing bias value, it is possible to enhance the quality with which data is read from or written to the optical disc.

To achieve the above object, according to another aspect of the present invention, a method for defocus adjustment in an optical disc apparatus that irradiates an optical disc with laser light to read data therefrom or write data thereto includes: a step of measuring the defocus adjustment value obtained when the amplitude of the RF signal of the optical disc apparatus is maximal; a step of measuring the defocus adjustment value obtained when the amplitude of the tracking error signal of the optical disc apparatus is maximal; a step of measuring the defocus adjustment value obtained when the jitter value of the optical disc apparatus is optimal; a step of measuring the defocus adjustment value obtained when the error rate of the optical disc apparatus is optimal; a step of determining a range of defocus values appropriate for smooth operation of the optical disc apparatus according to the defocus adjustment values measured respectively in the previous steps, and storing the determined range of appropriate defocus values in the memory; a step of measuring, when data is read from an optical disc, the defocus adjustment value obtained when the amplitude of the RF signal of the optical disc loaded in the optical disc apparatus is maximal; a step of measuring, when data is written to an optical disc, the defocus adjustment value obtained when the amplitude of the tracking error signal of the optical disc loaded in the optical disc apparatus is maximal; a step of comparing the defocus adjustment value obtained when the amplitude of the RF signal is maximal or when the amplitude of the tracking error signal is maximal with the range of appropriate defocus values; a step of correcting the defocus adjustment value so as to bring it within the range of appropriate defocus values; and a step of using the defocus adjustment value as a focusing bias value.

With this arrangement, it is possible to easily and quickly determine a defocus value that yields a large amplitude in the RF signal or in the tracking error signal combined with a good jitter value and a good error rate, and moreover, by adopting the defocus value determined through the defocus adjustment as a focusing bias value, it is possible to enhance the quality with which data is read from or written to the optical disc.

To achieve the above object, according to another aspect of the present invention, a method for defocus adjustment in an optical disc apparatus that irradiates an optical disc with laser light to read data therefrom or write data thereto includes: a step of storing in a memory a range of defocus values appropriate for smooth operation of the optical disc apparatus; a step of measuring a defocus adjustment value in relation to the optical disc loaded in the optical disc apparatus; a step of comparing the defocus adjustment value with the range of appropriate defocus values; a step of determining a defocus adjustment value; and a step of using as a focusing bias value a defocus adjustment value that falls within the range of appropriate defocus values.

With this arrangement, it is possible to easily and quickly perform defocus adjustment that ensures smooth, stable operation of the optical disc apparatus, and moreover, by adopting the defocus value determined through the defocus adjustment as a focusing bias value, it is possible to enhance the quality with which data is read from or written to the optical disc.

In the arrangement described above, the range of defocus values appropriate for smooth operation of the optical disc apparatus may be determined according to, with respect to the optical disc apparatus: the defocus adjustment value obtained when the amplitude of the RF signal is maximal, the defocus adjustment value obtained when the amplitude of the tracking error signal is maximal, the defocus adjustment value obtained when the jitter value is optimal, and the defocus adjustment value obtained when the error rate is optimal.

In the arrangement described above, the step of measuring a defocus adjustment value in relation to the optical disc loaded in the optical disc apparatus may be a step of, when data is read from the loaded optical disc, measuring as the defocus adjustment value the defocus adjustment value obtained when the amplitude of the RF signal is maximal, and, when data is written to the loaded optical disc, measuring as the defocus adjustment value the defocus adjustment value obtained when the amplitude of the tracking error signal is maximal.

BRIEF DESCRIPTION OF THE DRAWINGS

This and other objects and features of the present invention will become clear from the following description taken in conjunction with the preferred embodiments with reference to the accompanying drawings in which.

DETAILED DESCRIPTION OF PREFERRED EMBODIMENTS

Figure 1:
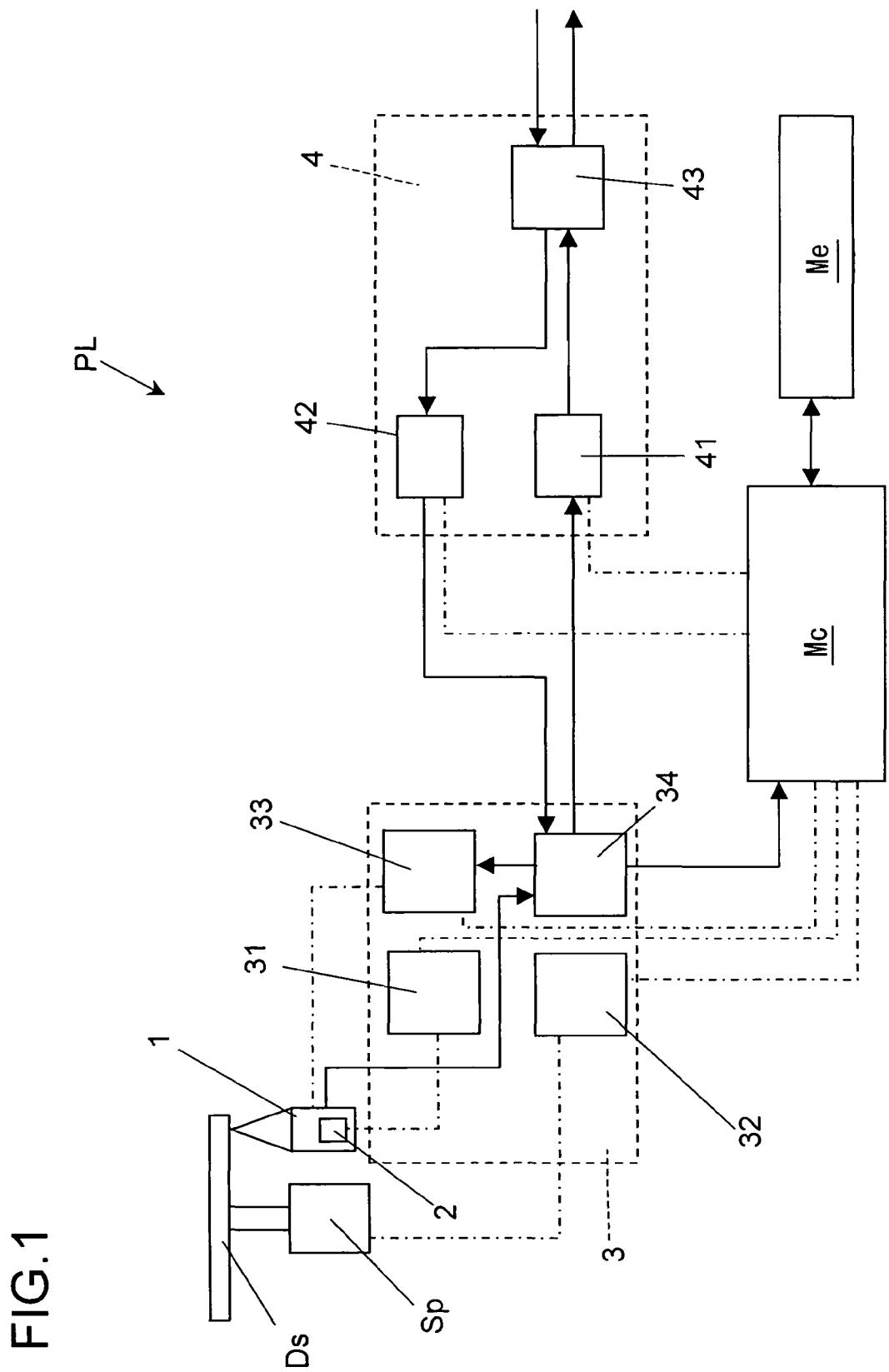
FIG. 1 is an arrangement diagram of an optical disc apparatus according to the present invention.

Hereinafter, an embodiment of the present invention will be described with reference to the accompanying drawings. FIG. 1 is an arrangement diagram of an optical disc apparatus according to the present invention. The optical disc apparatus PL shown in FIG. 1 has basically the same arrangement as the conventional optical disc apparatus. Specifically, the optical disc apparatus PL includes: a spindle motor Sp that rotates an optical disc Ds; an optical head 1 that irradiates the optical disc Ds with laser light to read information therefrom; a front end 3 that controls the spindle motor Sp and the optical head 1; a back end 4 that processes video, audio, and other source signals; a main controller Mc that controls the front end 3 and the back end 4; and a memory Me that stores various kinds of data. The optical head 1 includes an actuator 2 that changes the focus position (laser spot). In FIG. 1, solid lines represent paths along which video, audio, and other source signals pass, and dash-and-dot lines represent paths along which control signals or drive signals pass.

The front end 3 includes: an optical head servo controller 31 that controls the actuator 2 of the optical head 1; a spindle motor controller 32 that controls the rotation of the spindle motor Sp; a laser light controller 33 that controls the laser light from the optical head 1; and a signal processor 34 that modulates a photoelectric conversion signal photoelectrically converted by the optical head 1 and that extracts an RF signal and a tracking error signal.

The back end 4 includes: a decoder 41 that decodes encoded data fed from the front end 3 into source signals; an encoder 42 that encodes the source signals to be recorded to the optical disc Ds; and an input/output section 43 that outputs the source signals decoded by the decoder 41 to an external device or inputs data fed from an external device to the encoder 42.

In the optical disc apparatus PL, when data recorded on the optical disc Ds is read, first the main controller Mc transmits a control signal to the spindle motor controller 32. The spindle motor controller 32 transmits a drive signal to the spindle motor Sp to drive it. At this time, the main controller Mc feeds a control signal to the optical head servo controller 31 and the laser light controller 33.

On receiving the control signal, the laser light controller 33 transmits a drive signal to the optical head 1, and, on receiving the drive signal, the optical head 1 irradiates the optical disc Ds with laser light. On the other hand, on receiving the control signal, the optical head servo controller 31 outputs a servo control signal to the actuator 2 to control it so that the recording surface of the optical disc Ds is optimally irradiated with the laser light. Moreover, according to the RF signal from the optical head 1, the optical head servo controller 31 servo-controls the actuator 2 to optimize the irradiation with the laser light.

The laser light reflected from the recording surface of the optical disc Ds is converted into a photoelectric conversion signal by the optical head 1, and is then transmitted to the front end 3. The photoelectric conversion signal is inputted to the signal processor 34 of the front end 3 to be demodulated into a digital signal, and is then fed to the back end 4. The signal fed to the back end 4 is decoded into video, audio, and other source signals by the decoder 41. The data decoded by the decoder 41 is fed to the input/output section 43, where the data is converted into a format that can be played back on an external device (for example, a format that can be played back on a CRT monitor, liquid crystal monitor, or the like), and is then outputted to the external device.

When data is recorded to the optical disc Ds, source data from an external device is inputted to the input/output section 43, and is then fed to the encoder 42. The data is encrypted (enclosed) into a data format for recording on the optical disc Ds by the encoder 42, and is then fed to the signal processor 34. The signal processor 34 converts the encoded source data into a modulated signal, and sends it to the laser light controller 33. According to the modulated signal fed thereto, the laser light controller 33 sends a drive signal to the optical head 1. On receiving the drive signal, the optical head 1 irradiates the optical disc with laser light with predetermined timing and thereby records the data to the optical disc Ds.

When the optical head 1 irradiates the optical disc Ds with laser light, the main controller Mc outputs a control signal to the optical head servo controller 31 and the spindle motor controller 32. On receiving the control signal, the spindle motor controller 32 outputs a drive signal to the spindle motor Sp to rotate the spindle motor Sp so that the optical disc Ds is rotated at predetermined speed. On the other hand, on receiving the control signal, the optical head servo controller 31 outputs a servo control signal to the actuator 2 to control it so that the recording surface of the optical disc Ds is optimally irradiated with the laser light. Moreover, according to the TE signal from the optical head 1, the optical head servo controller 31 servo-controls the actuator 2 to optimize the irradiation with the laser light.

Figure 2:
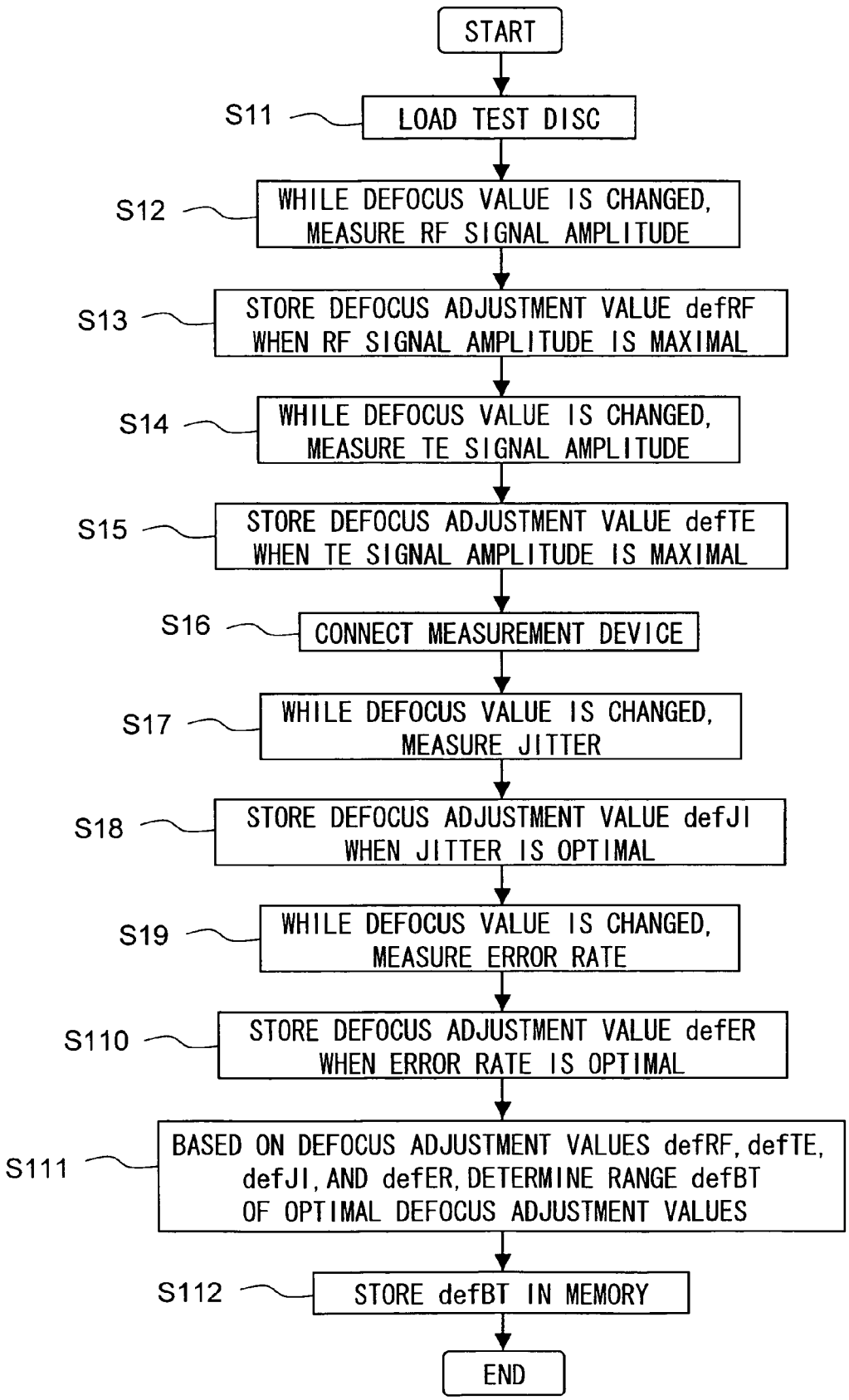
FIG. 2 is a flow chart of the flow of operation steps for incorporating a range of defocus values into the optical disc apparatus according to the present invention.

In the optical disc apparatus PL, when data is read from or written to the optical disc Ds, to permit the recording layer of the optical disc Ds to be irradiated with the focus of the laser light (laser spot), defocus adjustment is performed whereby the objective lens of the optical head 1 is moved toward or away from the optical disc Ds to find the optimal position. FIG. 2 is a flow chart of the flow of operation steps for incorporating a range of defocus values into the optical disc apparatus according to the present invention.

After the completion of the assembly of the optical disc apparatus, a test disc is loaded therein (step S1). Then, from the optical head servo controller 31 to the actuator 2, a focus servo control signal that causes the defocus value (the value of the voltage necessary to displace the laser spot) to change is outputted, and the amplitude of the RF signal as observed at that time is measured (step S12). The defocus value observed when the amplitude of the RF signal is maximal is stored as a defocus adjustment value defRF (step S13).

Next, from the optical head servo controller 31 to the actuator 2, a focus servo control signal that causes the defocus value (the value of the voltage necessary to displace the laser spot) to change is outputted, and the amplitude of the TE signal as observed at that time is measured (step S14). The defocus value observed when the amplitude of the TE signal is maximal is stored as a defocus adjustment value defTE (step S115).

Then an unillustrated measurement device is connected to the optical disc apparatus PL (step S16). Then, from the optical head servo controller 31 to the actuator 2, a focus servo control signal that causes the defocus value (the value of the voltage necessary to displace the laser spot) to change is outputted, and the jitter (for example, the fluctuation of the timing of the RF signal read from the test disc) observed at that time is measured (step S17). The defocus value observed when the jitter is optimal (the jitter value is minimal) is stored as a defocus adjustment value defJI (step S18).

Then, from the optical head servo controller 31 to the actuator 2, a focus servo control signal that causes the defocus value (the value of the voltage necessary to displace the laser spot) to change is outputted, and the error rate observed at that time is measured (step S19). The defocus value observed when the error rate is optimal (the error rate is minimal) is stored as a defocus adjustment value defER (step S110).

Then, based on the thus stored defocus adjustment values defRE, defTE, defJI, and defER, a range defBT of defocus values appropriate for the operation of the optical head 1 is determined (step S111). The determined range defBT of appropriate defocus values is stored in the memory Me (step S112).

In this way, from different view points, namely in terms of the RF signal, the TE signal, the jitter, and the error rate actually observed, a range defBT of defocus values that permits data to be read from or written to the optical disc Ds with high efficiency is stored in the memory Me, and thereby the manufacture of the optical disc apparatus PL is completed.

Figure 3:
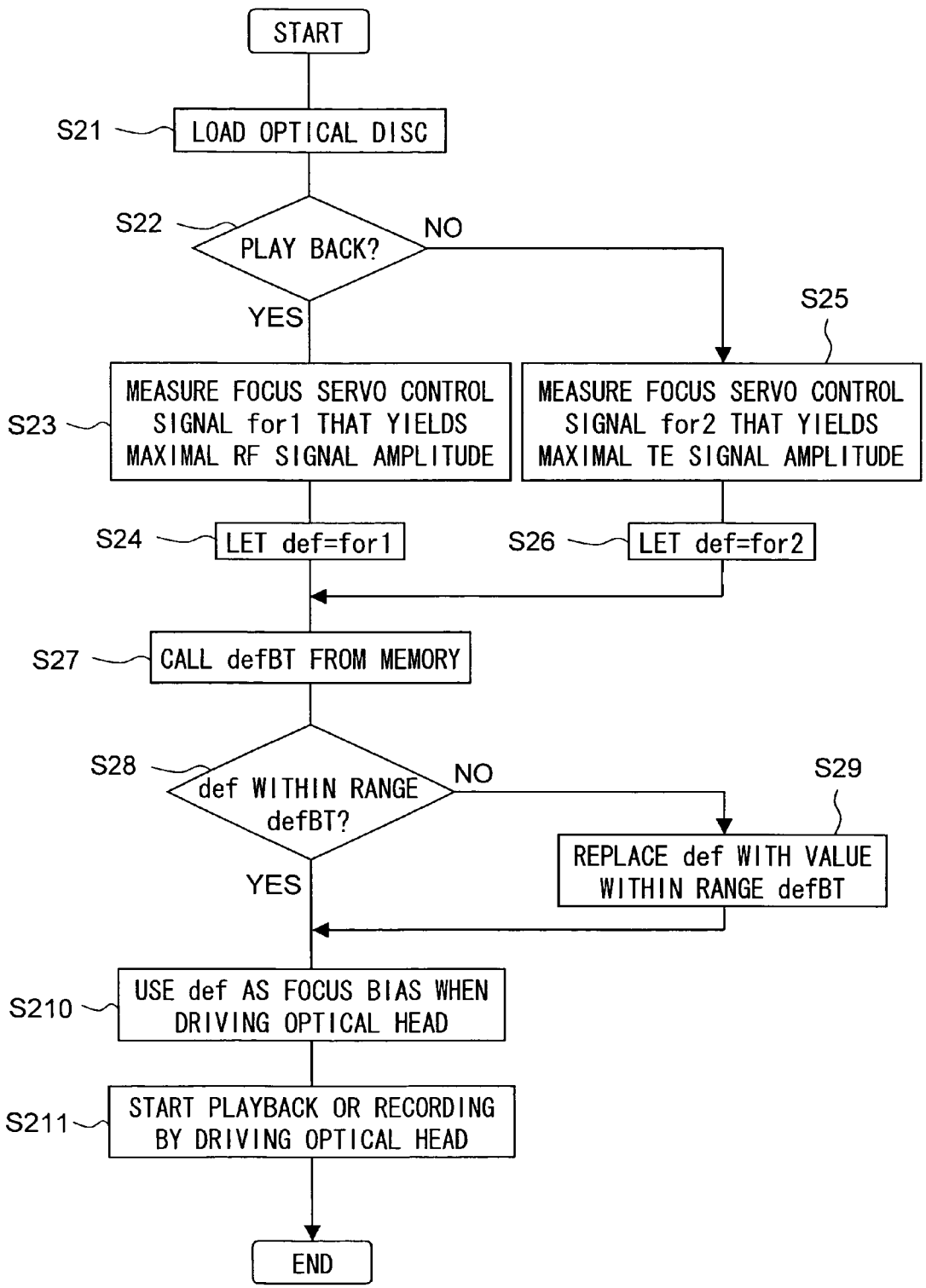
FIG. 3 is a flow chart of the flow of operation steps for setting a defocus value (focusing bias) when the optical disc apparatus according to the present invention is driven.

FIG. 3 is a flow chart of the flow of operation steps for setting a defocus value (focusing bias) when the optical disc apparatus according to the present invention is driven. Electric power is supplied to the optical disc apparatus PL, and an optical disc is loaded therein (step S21). At this time, whether to read data from the optical disc Ds loaded in step S21 or to record data to the optical disc Ds is checked (step S22).

When data is read from the optical disc Ds ("YES" in step S22), from the optical head servo controller 31 to the actuator 2, a focus servo control signal is outputted to change the position of the laser spot, and the defocus value for1 observed when the amplitude of the RF signal is maximal is measured (step S23). This defocus value for1 is used as a defocus adjustment value def (step S24).

When data is recorded to the optical disc Ds (when data is written) ("NO" in step S22), from the optical head servo controller 31 to the actuator 2, a focus servo signal is outputted to change the position of the laser spot, and the defocus value for2 observed when the amplitude of the TE signal is maximal is measured (step S25). This defocus value for1 is used as a defocus adjustment value def (step S26). Through the steps thus far, the defocus adjustment value in relation to the inserted optical disc Ds is measured.

Then the range defBT of defocus values appropriate for the optical head 1 as stored in the memory Me is called up (step S27). Then whether or not the defocus adjustment value def set in step S24 or S26 is within the range defBT of appropriate defocus values is checked (step S28). If the defocus adjustment value def is not within the range defBT of appropriate defocus values ("NO" in step S28), the defocus adjustment value def is replaced with a value that falls within the range defBT of appropriate defocus values (step S29). In this way, the defocus adjustment value def is so corrected as to fall within the range defBT of appropriate defocus values.

On the other hand, if the defocus adjustment value def is within the range defBT of appropriate defocus values ("YES" in step S28), or after the defocus adjustment value def is set in step S29, the defocus adjustment value def is used as a focusing bias value used when the optical head 1 is driven (step S210). Subsequently, the optical head 1 is driven, and data starts to be read or recorded (step S211).

In the manner described above, whether or not the defocus adjustment value def (the defocus value observed when the amplitude of the RF signal is maximal or when the amplitude of the TE signal is maximal) is within the prescribed range defBT of defocus values appropriate for the driving of the optical head 1 is checked. If not, a value that falls within the range defBT of appropriate defocus values is used as the defocus adjustment value to be used as a focusing bias value. This helps reduce the incidence of failure in which, while the RF signal or TE signal is within the reference range, the jitter and (or) the error rate are out of the reference ranges.

As described above, according to the present invention, it is possible to use a defocus value that suits the loaded optical disc as a focusing bias value, and thereby to realize an optical disc apparatus and a defocus adjustment method that permit data to be read from or written to an optical disc with enhanced quality.

Moreover, according to the present invention, it is possible to easily and quickly perform defocus adjustment that suits the loaded optical disc, and, by using the defocus value determined through the defocus adjustment as a focusing bias value, it is possible to realize an optical disc apparatus and a defocus adjustment method that permit data to be read from or written to an optical disc with enhanced quality.

What is claimed is:

1. An optical disc apparatus comprising:
    a spindle motor that rotates an optical disc;
    an optical head that irradiates the optical disc with laser light to read information therefrom or write information thereto, the optical head including an actuator that changes a focus position of the laser light;
    a front end that includes
        an optical head servo controller that servo-controls the actuator,
        a spindle motor controller that controls rotation of the spindle motor,
        a laser light controller that controls the laser light emitted from a laser light source of the optical head, and
        a signal processor that processes a signal read from the optical disc;
    a back end of encoder and decoder that processes video, audio, and other signals;
    a main controller that controls the front end and the back end; and
    a memory that stores various kinds of data,
    wherein
    in a first process performed during a manufacture of the optical disc apparatus, the memory stores a range of voltages as defocus values appropriate for smooth operation of the optical disc apparatus, the range of defocus values being determined according to defocus values measured respectively, with respect to the optical disc apparatus, when an amplitude of an RF signal is maximal, when an amplitude of a tracking error signal is maximal, when a jitter value is optimal, and when an error rate is optimal, and
    in a second process performed during a driving of the optical disc apparatus, the main controller,
    when data is read from a previously recorded optical disc, measures a defocus adjustment value obtained when an amplitude of an RF signal of an optical disc loaded in the optical disc apparatus is maximal,
    when data is written to an optical disc, measures a defocus adjustment value obtained when an amplitude of a tracking error signal of an optical disc loaded in the optical disc apparatus is maximal,
    when the defocus adjustment value thus measured is within the range of defocus values, uses the measured defocus adjustment value as a focusing bias value, and otherwise uses as a focusing bias value a value obtained by correcting the measured defocus adjustment value so as to bring the defocus adjustment value within the range of defocus values.

2. A method for defocus adjustment in an optical disc apparatus that irradiates an optical disc with laser light to read data therefrom or write data thereto, the method comprising:
    a step of measuring a voltage as a defocus value obtained when an amplitude of an RF signal of the optical disc apparatus is maximal;
    a step of measuring a voltage as a defocus value obtained when an amplitude of a tracking error signal of the optical disc apparatus is maximal;
    a step of measuring a voltage as a defocus value obtained when a jitter value of the optical disc apparatus is optimal;
    a step of measuring a voltage as a defocus value obtained when a error rate of the optical disc apparatus is optimal;
    a step of determining defocus adjustment values appropriate for smooth operation of the optical disc apparatus according to the voltages as defocus values measured respectively in the previous steps, and storing the determined defocus adjustment values in the memory;
    a step of measuring, when data is read from an optical disc, a voltage as a defocus value obtained when an amplitude of an RF signal of an optical disc loaded in the optical disc apparatus is maximal;
    a step of measuring, when data is written to an optical disc, a voltage as a defocus value obtained when an amplitude of a tracking error signal of an optical disc loaded in the optical disc apparatus is maximal;
    a step of comparing the voltage as the defocus value obtained when the amplitude of the RF signal is maximal or when the amplitude of the tracking error signal is maximal with the defocus adjustment values;
    a step of correcting the voltage as the defocus value so as to bring the defocus adjustment value within the defocus adjustment values; and
    a step of using the voltage as the defocus value as a focusing bias value.

3. A method for focus adjustment in an optical disc apparatus that irradiates an optical disc with laser light to read data therefrom or write data thereto, the method comprising:
    a step of storing in a memory a range of voltages as defocus values appropriate for smooth operation of the optical disc apparatus;
    a step of measuring a defocus adjustment value in relation to an optical disc loaded in the optical disc apparatus;
    a step of comparing the defocus adjustment value with the range of voltages as appropriate defocus values;
    a step of determining a defocus adjustment value; and
    a step of using as a focusing bias value a defocus adjustment value that falls within the range of voltages as appropriate defocus values,
    wherein, in the step of measuring a defocus adjustment value in relation to an optical disc loaded in the optical disc apparatus,
    when data is read from the loaded optical disc, a defocus adjustment value obtained when an amplitude of an RF signal is maximal is measured as the defocus adjustment value, and,
    when data is written to the loaded optical disc, a defocus adjustment value obtained when an amplitude of a tracking error signal is maximal is measured as the defocus adjustment value.

* * * * *